United States Patent
Bianchi

[11] 3,822,627
[45] July 9, 1974

[54] PRESS WITH A WORKING TABLE PROVIDED WITH AN INFLATABLE CUSHION

[76] Inventor: Vittorio Achille Bianchi, 37, avenue Paul Downer, Paris, France 75016

[22] Filed: Mar. 12, 1973

[21] Appl. No.: 340,176

[30] Foreign Application Priority Data
Apr. 10, 1972  France .............................. 72.12458

[52] U.S. Cl. ..................... 83/529, 83/541, 83/554, 83/563, 83/639
[51] Int. Cl. ............................................. B26d 5/12
[58] Field of Search ............ 83/529, 541, 554, 639, 83/563

[56] References Cited
UNITED STATES PATENTS

| | | | |
|---|---|---|---|
| 2,696,251 | 12/1954 | Hawkes | 83/541 X |
| 3,178,976 | 4/1965 | Kraut | 83/541 X |
| 3,273,491 | 9/1966 | Calvert | 83/554 X |
| 3,730,036 | 5/1973 | Batlory | 83/554 |

*Primary Examiner*—Frank T. Yost
*Attorney, Agent, or Firm*—Steinberg & Blake

[57] ABSTRACT

The press comprises a horizontal cutting table intended to receive the material to be cut and the cutting tool placed on the said material and a horizontally slidable carriage located at a level higher than that of the table, said table comprising a positioning plate which is vertically movable with respect to the said carriage, a pressing plate arranged above the positioning plate and movable vertically with respect to the latter, and an inflatable element interposed between the said plates and serving to drive the pressing plate towards the carriage so as to cause the cutting tool abutting against the said carriage to penetrate into the material to be cut.

10 Claims, 4 Drawing Figures

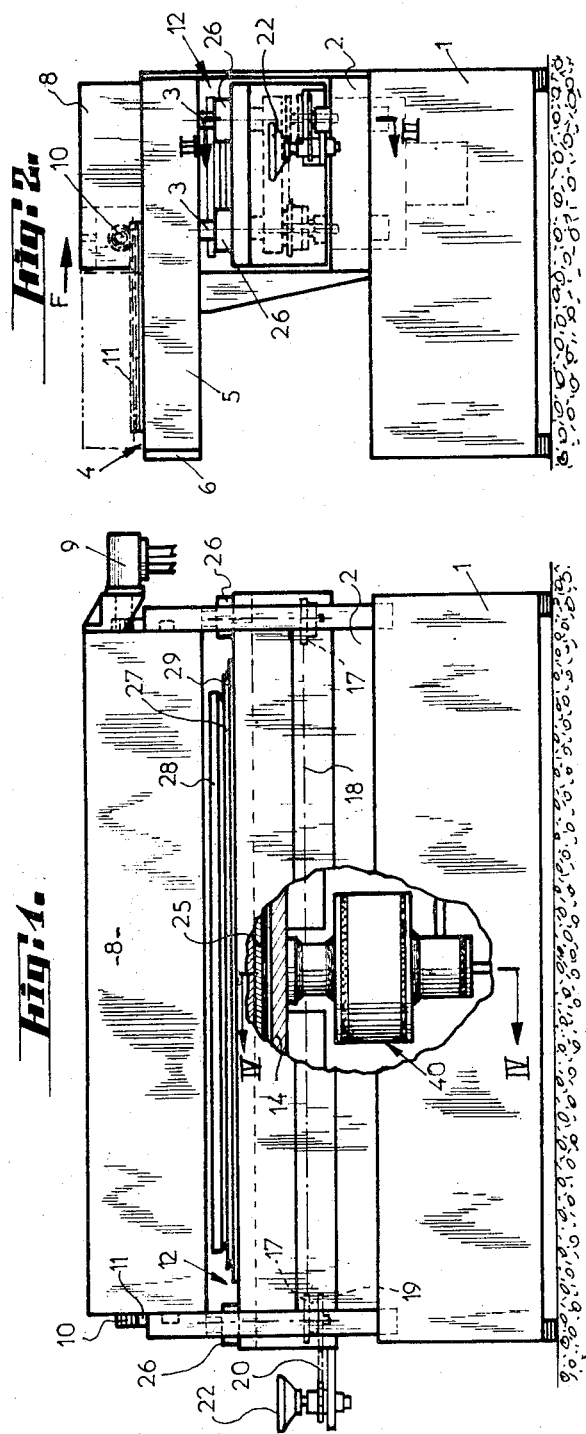

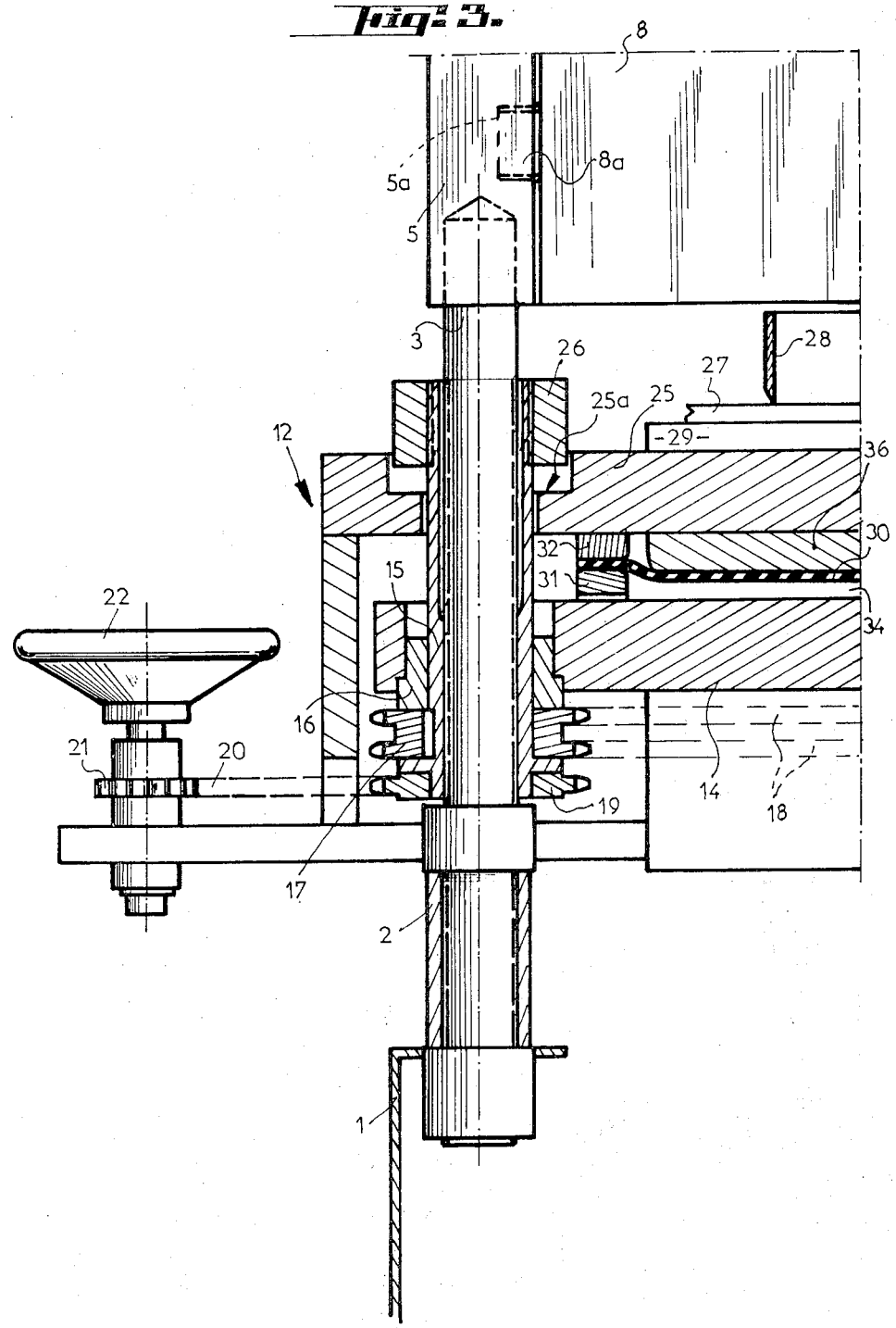

PRESS WITH A WORKING TABLE PROVIDED WITH AN INFLATABLE CUSHION

The present invention has essentially for its object a press for cutting a material in the form of a sheet, foil or layer, such as leather or a plastics material, of the type comprising a horizontal cutting table intended to receive the material to be cut and the cutting tool placed on the said material, and a carriage located at a stationary or non-stationary level higher than that of the table and movable horizontally so as to either overhang the latter or be moved aside therefrom.

In the presently known presses of this type, the table and the carriage are capable of relative vertical motion which, by bringing them nearer together to a maximum, enables a sufficient pressure to be exerted on the tool to cause the latter to penetrate into the material and, therefore, cut the latter. In order to achieve this relative motion, use is made of mechanical or hydraulic systems enabling either the table or the carriage to be driven in vertical translation, for example a set of four hydraulic actuators whose rods support the said table at its four corners.

There are a great number of drawbacks to such mechanical or hydraulic drive systems: their construction is complicated and expensive, their mounting is delicate and therefore entails high labour costs, and, lastly, it is difficult, with such systems, to maintain a perfect parallelism of the driven element, for example the cutting table, during its displacement, owing to the difficulties which are encountered in so controlling the various mechanical members or the various actuators as to ensure a perfect synchronism of their actuation. Various means have been suggested to try to maintain the said synchronism by compensating for or preventing the various asymmetries resulting from the plays of the mechanical members or the leaks from the system of actuators, but the said means complicate the construction of the press and increase its cost still further.

The purpose of the present invention is to avoid the aforesaid drawbacks by providing a press characterized in that the cutting table comprises a positioning plate movable vertically with respect to the carriage, a pressing plate arranged above the positioning plate and movable vertically with respect to the latter and an inflatable element interposed between the said plates and serving to drive the pressing plate towards the carriage so as to cause the cutting tool abutting against the said carriage to penetrate into the material to be cut.

The use of an inflatable element for driving the pressing plate constitutes a considerable simplification as compared with the previously known drive systems and enables costs to be reduced considerably. In addition, such an inflatable element enables an extremely high cutting pressure to be obtained.

According to another feature of the invention, the said positioning plate is supported by stationary vertical uprights of the press, with respect to which they are slidable, drive means being provided to displace the said plate between a lower position in which the tool is disengaged from the carriage and a higher position in which the tool is in contact with the said carriage.

Owing to this positioning plate, the tool may be brought into close contact with the carriage prior to the cutting operation, this adjustment enabling the differences in height between the various cutting tools and the various thicknesses of the material to be cut to be compensated for.

According to still another feature of the invention, the said vertical uprights are constituted by threaded columns, the said drive means being constituted by threaded sleeves screwed on the said columns and supporting the positioning plate.

According to still another feature of the invention, the said sleeves are solid in rotation and driven by a common actuating member.

An accurate adjustment of the positioning plate is thus obtained while at the same time maintaining its parallelism.

According to still another feature of the invention, the pressing plate is mounted slidingly on the said sleeves.

Again according to the invention, each sleeve is provided at its upper end with an adjustable stop limiting the displacement of the pressing plate and ensuring its parallelism with the said carriage at the end of the travel of the said pressing plate.

The maintenance of a strict parallelism of, on the one hand, the positioning plate and, on the other hand, the pressing plate enables a perfectly accurate and high-quality cutting to be obtained.

Other features and advantages of the invention will appear as the following description proceeds.

In the appended drawings given solely by way of example:

FIG. 1 is an elevational front view, partially broken away, of a press according to one form of embodiment of the invention;

FIG. 2 is an elevational side view of the said press;

FIG. 3 is a partial sectional view, to a larger scale, of the said press;

Figure 4:
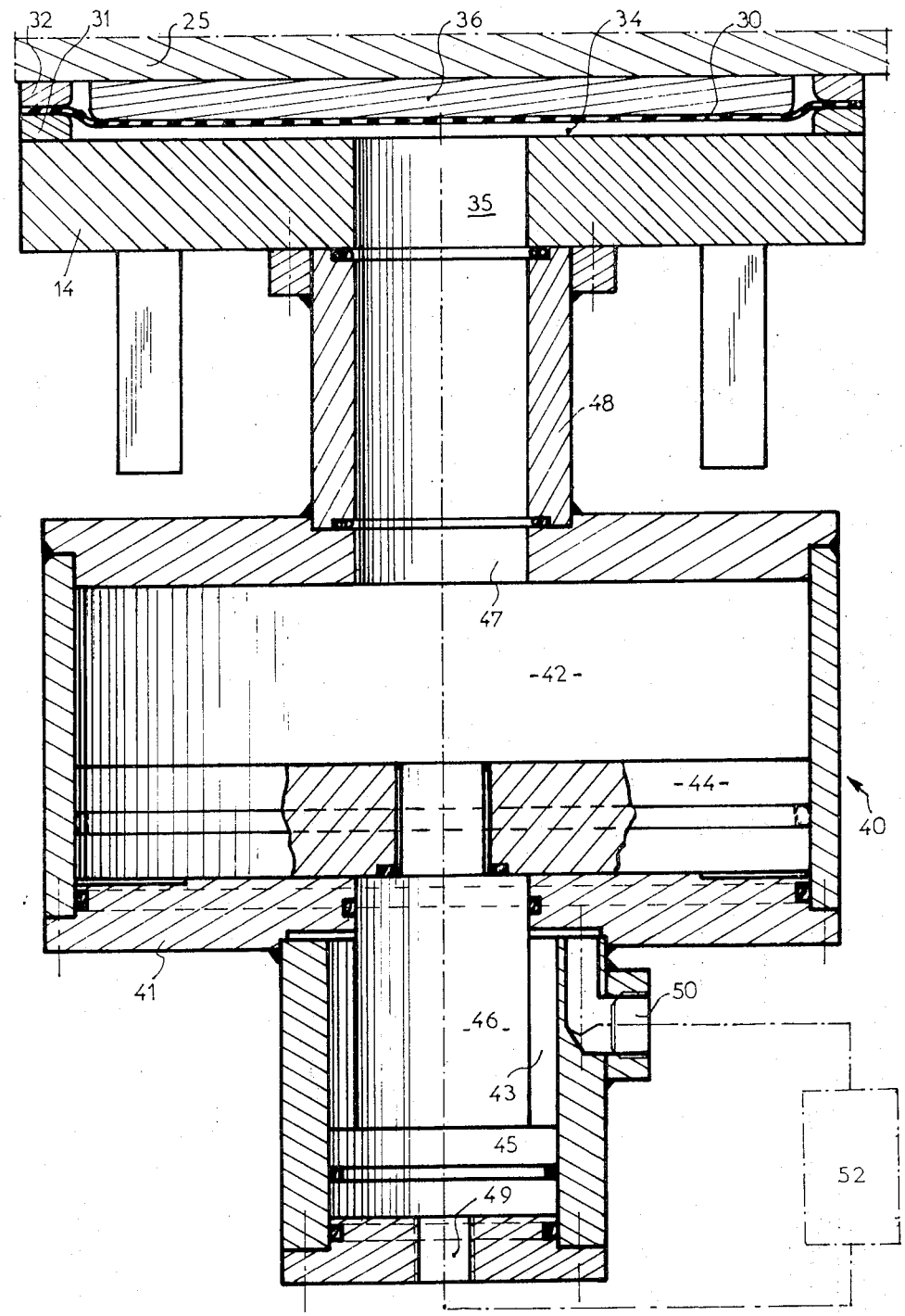
FIG. 4 is a sectional view of the hydraulic supply actuator of said inflatable enclosed space.

According to the form of embodiment illustrated in the drawings, the press is essentially constituted by a stationary base designated generally by the reference numeral 1, on which is mounted a rigid casing or the like 2 which bears, through the medium of four vertical columns 3, a carriage support frame 4 formed of two identical longitudinal horizontal beams 5 parallel with one another and interconnected at their rear ends by a cross-member 6.

A carriage 8 slides horizontally on the frame 4 along slide-guides 5a provided on the internal faces of the longitudinal beams 5 and in which are engaged the counter-guides 8a of the carriage 8. The carriage 8 is provided with an actuator 9, for example a hydraulic motor, enabling it to be driven in translation on the frame 4 through the medium of pinions 10 meshing with racks 11 solid with the longitudinal beams 5. The carriage 8 may be moved in translation between two extreme positions: one in which it is moved completely aside from the working table (this position being shown in dash-dotted lines in FIG. 2), and another in which it completely covers or overhangs the said table (this position being shown by continuous lines in FIG. 2).

The working table 12 comprises essentially a lower plate or positioning plate 14 supported by four threaded sleeves such as 15 screwed on the four threaded columns 3, through the medium of four bearings or the like such as 16. Each of the threaded sleeves 15 is provided at its lower portion with a pinion 17 provided with a double set of teeth. A double chain 18 meshes with the four pinions 17 so as to form a transmission means to drive in synchronous rotation the threaded sleeves 15 on their respective columns. One of the sleeves (the one shown in FIG. 3) is provided with an additional drive pinion 19 connected through the medium of a chain 20 to a pinion 21 driven in rotation by a manual operating wheel 22.

The working table 12 also comprises an upper plate or pressing plate 25 arranged above the plate 14 and slidingly engaged on the four sleeves 15. Each sleeve 15 is provided at its upper portion with a stop 26 serving to limit the upward travel of the upper plate 25. This stop is constituted by a hollow member, preferably cylindrical in shape, provided with an internal thread and screwed on an external thread provided at the upper portion of the sleeve 15, so that it is adjustable in position. The upper plate 25 is provided with recesses 25a intended to come into contact with the lower face of the stop 26. The four stops 26 are so adjusted as to ensure a perfectly horizontal position of the plate 25 at the end of its travel.

The plate 25 is intended to receive the material to be cut, for example a leather sheet 27 on which is placed the cutting tool 28. The plate 25 is covered with a cutting bed 29, for example a rubber bed, intended to protect the cutting portion of the cutting tool 28.

The inflatable element for driving the upper plate 25 in vertical translation is constituted by a supple membrane 30, for example a rubber membrane, sealingly secured on the lower plate 14 by means of two circular flanges 31 and 32. The space comprised between the upper face of the plate 14 and the membrane 30 constitutes a sealingly enclosed space or chamber 34 which communicates, through the medium of an orifice 35 passing through the lower plate 14, with a pressurized fluid supply device constituted by a multiplying actuator secured to the plate 14 and designated generally by the reference numeral 40. The upper plate 25 rests upon the membrane 30 through the medium of a shoe or the like 36.

The multiplying actuator 40 comprises essentially a housing 41 provided internally with two chambers, one of which 42, is relatively large in size whereas the other 43, is relatively reduced in size, and in which are slidingly mounted pistons 44 and 45 respectively, interconnected by a rod 46. The chamber 42 is provided at its top with an orifice 47 which communicates, through the medium of a conduit 48, with the orifice 35 passing through the lower plate 14 and, therefore, with the inflatable enclosed space 34. The enclosed space 34, the chamber 42 and the conduit 48 are filled with a fluid, for example oil, under pressure. The lower chamber 43 is provided with two orifices 49 and 50 opening on either side of the piston 45 and connected to a source of fluid under high pressure, shown diagrammatically at 52.

The press operates as follows.

While the working table 12 is in the lower position shown in the Figures and the carriage 8 is in the position shown in dotted lines in FIG. 2, the material 27 to be cut is placed on the cutting bed 29, and then the cutting tool 28 is laid on the said material. Thereafter, the table 12 is moved upwards by means of the hand wheel 22 until the upper edge of the cutting tool 28 comes into contact with the lower face of the carriage 8. When this is done, fluid under pressure is supplied to the multiplying actuator from the source 52 so as to raise the piston 45. The latter drives the piston 44 which, in its turn, delivers the oil into the enclosed space 34, thus inflating the supple membrane 30 and driving the upper plate 25 in upward translation. The pressure exerted by the plate 25 causes the tool to penetrate into the sheet of material, thus cutting the latter. At the end of its travel the plate 25 comes into contact with the stops 26, thus ensuring a perfectly horizontal position of the said plate.

In order to lower the pressing plate 25, it is sufficient to reverse the direction of supply of fluid into the lower chamber 43; as a result of the downward sliding of piston 45, the oil is sucked from the enclosed space 34 and, therefore, the inflatable element is deflated.

It is thus understood that owing to the use of a multiplying actuator, the press according to the invention enables an important volume of low-pressure oil to be injected under a large-area supple membrane from a source of pressure containing a relatively small volume of hydraulic fluid under high pressure.

Of course, the invention is by no means limited to the form of embodiment described and illustrated, which has been given by way of example only. In particular, it comprises all the means constituting technical equivalents to the means described as well as their combinations, should the latter be carried out according to the spirit of the invention.

What is claimed is:

1. Press for cutting a material in the form of a sheet, foil or layer, comprising a stationary base, vertical uprights supported on said stationary base, a carriage support frame carried by said vertical uprights, a horizontally slidable carriage mounted on said support frame and a horizontal cutting table located beneath said carriage and intended to receive the material to be cut and a cutting tool placed on the said material, said cutting table comprising a positioning plate slidably supported on said vertical uprights and vertically movable with respect to the said carriage, a pressing plate arranged above the positioning plate and movable vertically with respect to the latter, and an inflatable element interposed between the said plates and serving to drive the pressing plate towards the carriage so as to cause the cutting tool abutting against the said carriage to penetrate into the material to be cut.

2. Press according to claim 1, wherein drive means are provided to displace said positioning plate between a lower position in which said tool is disengaged from said carriage and a higher position in which said tool is in contact with said carriage.

3. Press according to claim 2, wherein said vertical uprights are constituted by threaded columns, the said drive means being constituted by threaded sleeves screwed on the said columns and supporting said positioning plate.

4. Press according to claim 3, wherein a transmission means is operatively connected with said sleeves to drive them in synchronous rotation and is driven by a common actuating member.

5. Press according to claim 4, wherein said pressing plate is slidingly mounted on the said sleeves.

6. Press according to claim 5, wherein said sleeve is provided at its upper portion with an adjustable stop limiting the displacement of the pressing plate and ensuring its parallelism with the said carriage at the end of its travel.

7. Press according to claim 1, wherein said inflatable element comprises a supple membrane defining an enclosed space connected to means for supplying a fluid under pressure.

8. Press according to claim 7, wherein said supple membrane is sealingly secured on the said positioning plate.

9. Press according to claim 7, wherein said means for supplying a fluid under pressure comprise a multiplying actuator having a chamber connected to the said enclosed space and in which slides a supply piston connected to a double-acting drive piston, the displacement of the said supply piston causing the said enclosed space to be inflated or deflated.

10. Press according to claim 9, wherein said actuator is fixed with said positioning plate.

* * * * *